United States Patent
Rao (10) Patent No.: US 11,755,007 B2
(45) Date of Patent: Sep. 12, 2023

(54) SYSTEM AND METHOD FOR DETERMINING A HEALTH CONDITION AND AN ANOMALY OF AN EQUIPMENT USING ONE OR MORE SENSORS

(71) Applicant: JEF TECHNO SOLUTIONS PVT LTD, Bangalore (IN)

(72) Inventor: Prashanth Belur Gururaja Rao, Bangalore (IN)

(73) Assignee: JEF TECHNO SOLUTIONS, PVT LTD, Bangalore (IN)

(*) Notice: Subject to any disclaimer, the term of this patent is extended or adjusted under 35 U.S.C. 154(b) by 0 days.

(21) Appl. No.: 17/471,030

(22) PCT Filed: Oct. 25, 2019

(86) PCT No.: PCT/IN2019/050786
§ 371 (c)(1),
(2) Date: Sep. 9, 2021

(87) PCT Pub. No.: WO2020/234894
PCT Pub. Date: Nov. 26, 2020

(65) Prior Publication Data
US 2022/0308572 A1      Sep. 29, 2022

(30) Foreign Application Priority Data
May 20, 2019 (IN) .............................. 201941019900

(51) Int. Cl.
*G05B 23/02* (2006.01)

(52) U.S. Cl.
CPC ..... *G05B 23/0283* (2013.01); *G05B 23/0232* (2013.01)

(58) Field of Classification Search
CPC .............. G05B 23/0232; G05B 23/024; G05B 23/0283
USPC ......................................................... 702/184
See application file for complete search history.

(56) References Cited

U.S. PATENT DOCUMENTS 7,002,462 B2*   2/2006   Welch ..................... B66B 27/00
                                                            340/3.1
9,607,652 B2*   3/2017   Bose ..................... A63F 13/211

* cited by examiner

Primary Examiner — John H Le (57) ABSTRACT

A system for determining a health condition and an anomaly of a field equipment 104 is provided. The system includes sensors 106A-N which sense information associated with the equipment 104, a field device 110 which receives the sensor data from sensors 106A-N, a camera unit 108 that captures visual data of the equipment 104 and a server 112. The server 112 includes a database 114 that stores the sensor data and the visual data. The server 112 further includes a fault detection module 202 that processes the sensor data to determine a fault or the health condition of the equipment 104, an image processing module 204 that is trained to detect the irregularities/anomaly in the equipment 104 by processing the visual data, and a report generation module 206 that generates an automated health report 212 based on the detected anomaly and the health condition of the equipment 104.

10 Claims, 9 Drawing Sheets

GENERAL ELECTRICAL SAFETY AUDIT

Electricity Safety Audit is an important tool to identify potential hazards, vulnerable areas for total safety

OBSERVATION ON ELECTRICAL SAFETY

| | |
|---|---|
| Location1: | Battery bank |
| Observation - | Battery Bank |
| Recommendation - | The batteries shall be placed with 1.2 m clearance from electrical panels |
| Criticality Level: | Medium |
| Standard Reference | NEC 2017 Article 110 Part II |

502

OTHER OBSERVATIONS

All panels & DB's were checked for easy access & was found to be in order. As per CEIG norms & NEC India, all LT panels and DB's are to be provided with 1m clear access space in front of the panel with a clear height of 1.8m.

SUMMARY

Total Observations: 2

| DESCRIPTION | OBSERVATION COUNT |
|---|---|
| HIGH | 0 |
| MEDIUM | 2 |
| LOW | 0 |
| NONE | 0 |
| CATEGORY TOTAL | 2 |

SYSTEM AND METHOD FOR DETERMINING A HEALTH CONDITION AND AN ANOMALY OF AN EQUIPMENT USING ONE OR MORE SENSORS

BACKGROUND

Technical Field

The embodiments herein generally relate to automation of analytical diagnostic tool, and more particularly relate to a system and method for determining the health condition and anomalies of an equipment for carrying out electrical and fire safety audits for detecting failures and also to predict possible corrosion in equipment.

Description of the Related Art

In industrial setups, there are very significant electrical equipments that play a major role in the work-flow of the industry. These equipments are manufactured while keeping in mind their reliability, integrity, durability, etc. However, these equipments are just man-made machines which are bound to fail at some point. The reason for failure is a wide spectrum of possibilities that cannot be determined with accuracy and efficiency by human effort. The reason for failure may include manufacturing defects, anomalies, non-adherence to the industry standards, non-ideal conditions of operation, etc. Traditionally, human intervention is required to monitor these equipments for anomalies and proper functioning. It remains impossible to efficiently monitor the equipments at all times and to predict the next point of failure. Typically, health reports are generated by human intervention where a lot of effort is required to articulate all the relevant information in a single document. This process is repetitive and traditionally requires a lot of human effort.

Existing approaches have been developed to address the above problem and which involves the use of a field engineer or an expert who can interpret the data from the equipment directly with his expertise. This way of data collection is very time consuming and the accuracy of the data is dependent on the skill of the field engineer or the expert who is working to get the required data from the machine or the equipment that has been tested. The tendency of the human to evaluate or process the gathered information and generate a health report is based on various factors that tend to change as per time.

Accordingly, there remains a need for a system and method which can monitor the equipment in real-time with improved accuracy without false observations.

SUMMARY

In view of the foregoing, an embodiment herein provides a system for determining the health condition and an anomaly of an equipment. The system includes (A) a plurality of portable sensors that are attached to the equipment, wherein the plurality of sensors senses information associated with a plurality of parameters of the equipment, (B) a field device that is communicatively connected to the plurality of sensors, wherein the plurality of sensors is configured to wirelessly communicate the sensor data to the field device, (C) a camera unit that captures visual data associated with the equipment being analyzed, wherein the camera unit is configured to wirelessly communicate the captured images to the field device and (D) a server that is communicatively connected to the field device for receiving the sensor data and the visual data associated with the equipment. The server comprises of (a) a database that stores (i) the sensor data and (ii) the visual data, wherein the sensor data comprises values of the plurality of parameters associated with the equipment, and wherein the visual data comprises at least one of (i) a plurality of images of the equipment or (ii) a plurality of videos of the equipment; and (b) a processor that executes a set of modules, wherein the set of modules comprises (i) a fault detection module that processes the sensor data to determine a fault or the health condition of the equipment, (ii) an image processing module that is trained to detect the anomaly in the equipment by processing the visual data associated with the equipment, and (iii) a report generation module that automatically generates a health report based on the health condition of the equipment and the anomaly detected in the equipment.

In some embodiments, the processor comprises a work order module that generates a work order when initiated by a client device, wherein the work order comprises a request to determine a health condition of the equipment and an anomaly in the equipment.

In some embodiments, the sensor data and the visual data of the equipment are tagged with at least one of (i) a customer identifier, (ii) a work order identifier, (iii) a location identifier, (iv) a facility identifier, (v) a floor identifier, (vi) an equipment type, (vii) an anomaly type or (vii) an image identifier or a video identifier.

In some embodiments, the fault detection module communicates with the sensor data and the image data stored in the database and makes use of machine learning module to determine an anomaly if there is a fault. The machine learning module may get trained periodically by image processing module that analyses the visual data and determines the type of fault accordingly based on historical data available.

In some embodiments, the health report comprises at least one of (i) a location of the equipment, (ii) an observation based on the sensor data and the visual data, (iii) a recommendation to rectify a fault or an anomaly detected in the equipment, (iv) a criticality level of the fault or the anomaly detected in the equipment or (v) a reference to industry standards and wherein the health report is communicated to the client device.

In some embodiments, (i) the sensor data and (ii) the visual data are communicated from the field device to the server in a plurality of stages, wherein after each of the plurality of stages, the server generates an alert to the field device, wherein the alert comprises data regarding consistency and relevance of (i) the sensor data and (ii) the visual data.

In one aspect a method for determining the health condition and an anomaly of equipment is provided. The method comprises the steps of (i) sensing, using a plurality of sensors, information associated with a plurality of parameters of the equipment, wherein the plurality of sensors is attached to the equipment; (ii) communicating, using the plurality of sensors, the sensor data to a field device, wherein the field device is communicatively connected to the plurality of sensors; (iii) capturing, a camera unit, visual data associated with the equipment being analyzed, wherein the camera unit is configured to wirelessly communicate the captured images to the field device; (iv) generating a database, in a server, with (i) the sensor data and (ii) the visual data, wherein the sensor data comprises values of the plurality of parameters associated with the equipment, and wherein the visual data comprises at least one of (i) a plurality of images of the equipment or (ii) a plurality of videos of the equipment; (v) processing, using a fault detection module of the server the sensor data to determine a fault or the health condition of the equipment; (vi) training an image processing module of the server to detect an anomaly in the equipment by processing the visual data; and (vii) generating, using a report generation module of the server, a report based on the health condition of the equipment and the anomaly detected in the equipment.

In some embodiments, the method comprises tagging (i) the sensor data and (ii) the visual data with at least one of (i) a customer identifier, (ii) a work order identifier, (iii) a location identifier, (iv) a facility identifier, (v) a floor identifier, (vi) an equipment type, (vii) an anomaly type or (vii) an image identifier or a video identifier.

In some embodiments, the method comprises communicating (i) the sensor data and (ii) the visual data in a plurality of stages from the field device, wherein after each of the plurality of stages, the server (112) generates an alert to the field device (110), wherein the alert comprises data regarding consistency and relevance of (i) the sensor data and (ii) the visual data.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof and the appended claims.

BRIEF DESCRIPTION OF THE DRAWINGS

The embodiments herein will be better understood from the following detailed description with reference to the drawings, in which.

DETAILED DESCRIPTION OF THE DRAWINGS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

There is a need for an improved system that efficiently predicts and detects the fault or health condition of an equipment using an automation process and use of the analytics to predict and detect failures. The embodiments herein achieve this by automation cum analytical diagnostic system which is used for performing safety audits to predict and detect failures and to prevent corrosion in equipment/pipelines. Referring now to the drawings, and more particularly to FIGS. 1 through 7, where similar reference characters denote corresponding features consistently throughout the figures, there are shown preferred embodiments.

Figure 1:
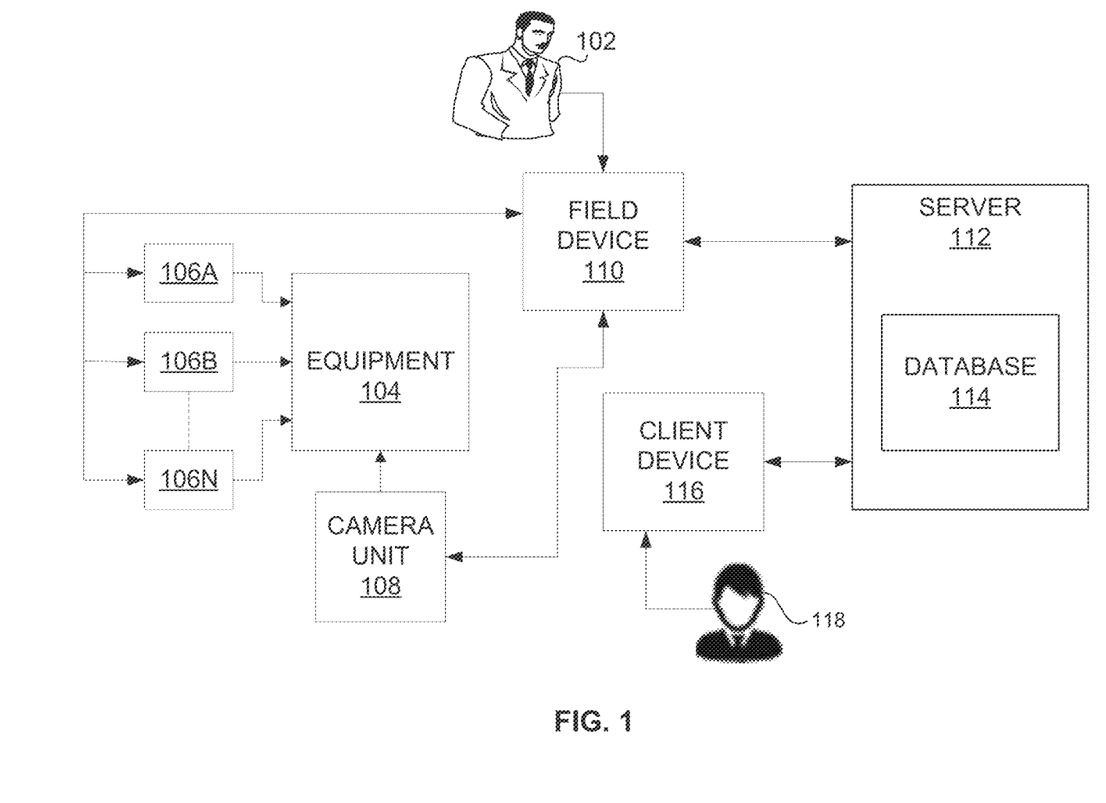
FIG. 1 illustrates a system for determining a health condition and an anomaly of an equipment according to an embodiment herein.

FIG. 1 illustrates a system for determining a health condition and an anomaly of an equipment according to an embodiment herein. The system includes a field equipment 104, a plurality of sensors 106A-N, a camera unit 108, a field device 110, a server 112, a database unit 114, a client device 116. A field engineer 102 is interacting with the field device 110. The plurality of sensors 106A-N and the camera unit 108 are arranged around the field equipment 104. This plurality of sensors 106 and the camera unit 108 are communicatively connected to the field device 110. The plurality of sensors 106A-N senses information associated with a plurality of parameters of the equipment 104. The plurality of sensors 106A-N are configured to wirelessly communicate the sensor data to the field device 110. The camera unit 108 captures visual data associated with the equipment being analyzed. The camera unit 108 is configured to wirelessly communicate the captured images to the field device 110. The field device 110 communicates the sensor data (not shown in the figure) and the visual data (not shown in the figure) to the server 112 over a network and stored in the database 114.

In some embodiments, the plurality of sensors 106A-N associated with the equipment 104 may be fixed at specific points in a physical space near the equipment 104. The plurality of sensors 106A-N measures data specific to the equipment 104 they are associated with. The data being collected may include a temperature of the equipment 104, a voltage and a current, etc. In some embodiments, the camera unit 108 may be used to capture photographs of an equipment 104 from different angles. In some embodiments, this camera unit 108 may be used for live streaming of video and audio of the equipment 104 when required.

The field engineer 102 interacts with the field device 110 by providing instructions to start capturing the data and the data is then transferred to the server 112 by providing a synchronize instruction.

In some embodiments, the field device 110 may have a storage memory in regards to storing the sensor data and the image/visual data within itself until the data is transmitted to the server 112. In some embodiments, the field device 110 may transmit the sensor data and the image/visual data over the network in a plurality of stages to the server 112. For each of the plurality of stages, the server 112 may generate an alert to the field device 110 regarding the consistency and relevance of the sensed data. In some embodiments, the sensor data comprises values of the plurality of parameters associated with the equipment 104. The visual data comprises at least one of (i) a plurality of images of the equipment or (ii) a plurality of videos of the equipment 104.

The server 112 processes the sensor data to determine a fault or the health condition of the equipment 104. The server 112 is trained to detect an anomaly in the equipment 104 by processing the visual data associated with the equipment 104. The server 112 automatically generates a health report based on the health condition of the equipment 104 and the anomaly detected in the equipment 104. The server 112 may provide the health report on a client device 116. The client 118 may access the health report by interacting with the client device 116.

Figure 2:
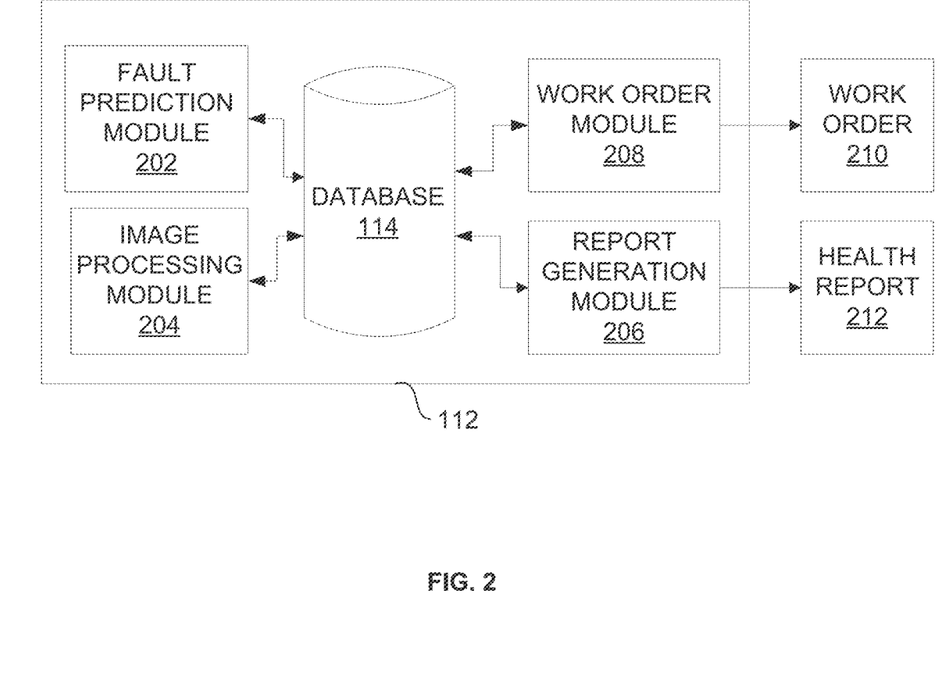
FIG. 2 illustrates an exploded view of a server of FIG. 1 according to an embodiment herein.
Figure 3A:
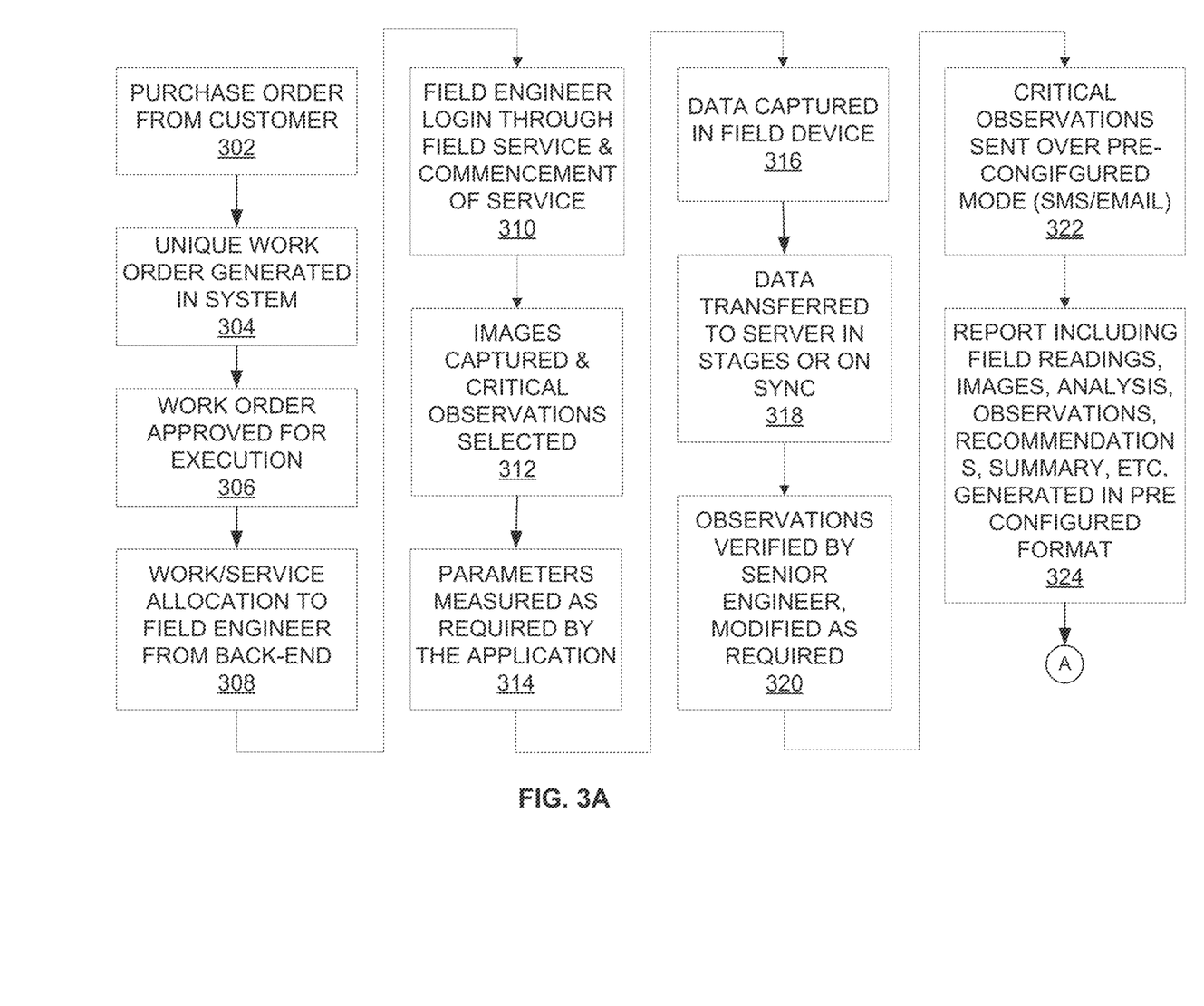
FIG. 3A & FIG. 3B are process flow that illustrates a method for determining a health condition and an anomaly of an equipment according to an embodiment herein.
Figure 3B:
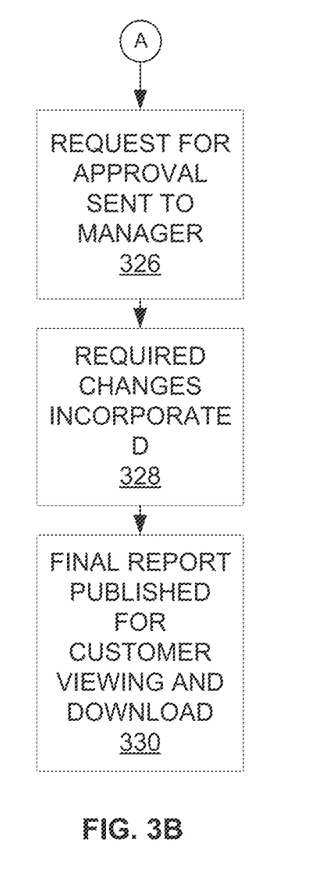

FIG. 2 illustrates an exploded view of the server 112 of FIG. 1 according to an embodiment herein. The server 112 includes a database 114 where all the visual data and the sensor data is stored after being checked for consistency and relevance, a fault detection module 202, an image processing module 204, a work order module 208 which initiates a work order 210 on initiation from the client device 116, and a report generation module 206.

The fault detection module 202 processes the sensor data to determine a fault or the health condition of the equipment 104. The image processing module 204 is trained to detect an anomaly in the equipment 104 by processing the visual data associated with the equipment 104. The report generation module 206 automatically generates a health report 212 based on the health condition of the equipment 104 and the anomaly detected in the equipment 104. The health report 212 may be provided as an output on the client device 116.

In some embodiments, the fault detection module 202 and image processing module communicate with the field device 110 to receive the sensor data and the visual data respectively. Depending on the field metrics such as connectivity, the sensor and visual data may be received in real-time or periodically in at least one stage. In some embodiments, for each of the plurality of the stages, the server may alert the field device 110 regarding the consistency and relevance of the data received. The sensor and visual data may be tagged with at least one of the following (i) a customer identifier, (ii) a work order identifier, (iii) a location identifier, (iv) a facility identifier, (v) a floor identifier, (vi) an equipment type (vii) an anomaly type, (viii) a image identifier or (ix) a video identifier.

In some embodiments, the report generation module 206 may include the facility to generate a health report 212 signed by a customer and to be uploaded when the work order 210 is completed.

With reference to FIGS. 1 to 2, FIG. 3A & FIG. 3B are process flow that illustrates a method for determining a health condition and an anomaly of an equipment 104 according to an embodiment herein. In step 302, a purchase order is received from a customer. In step 304, a unique work order 210 is generated by the work order module 208. In step 306, the work order 210 is approved for execution. In step 308, work/service is allocated to a field engineer 102 from the server 112. In step 310, the field engineer logs in through field service & the service commences. In step 312, images of the equipment 104 are captured & critical observations from the image of the equipment 104 are selected. In step 314, parameters are measured as required by a monitoring system. In step 316, the sensor and the visual data are captured in field device 110. In step 318, the sensor and the visual data are transferred to the server 112 in stages or on synchronization. In step 320, observations from the sensor and the visual data are verified by a senior engineer and modified as required. In step 324, critical observations from the sensor and the visual data are sent over pre-configured mode (SMS/e-mail) to a client device 116. In step 326, a health report 212 including field readings, images, analysis, observations, recommendations, summary, etc. is generated in a pre-configured format. In step 326, a request for approval is sent to a manager who supervises the equipment monitoring process. In step 328, required changes are incorporated by the system as required. In step 330, the final health report 212 is published for a customer to view and download.

Figure 4:
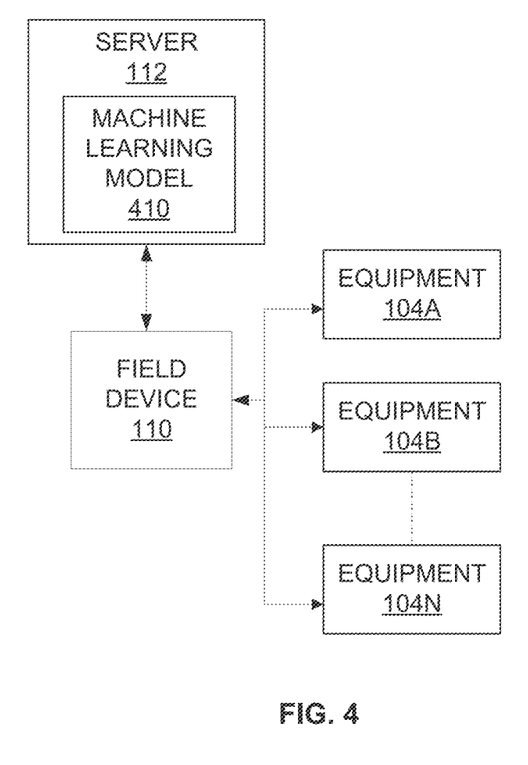
FIG. 4 is a block diagram that illustrates a system that comprises a machine learning model for determining a health condition or an anomaly of an equipment according to an embodiment herein.

FIG. 4 is a block diagram that illustrates a system that comprises a machine learning model 410 for determining a health condition or an anomaly of an equipment 104, according to an embodiment herein. The system includes a server 112 that employs a machine learning model 410 for determining a health condition or an anomaly of the equipments 104A-N. The machine learning model 410 performs analytics over historical data of an equipment 104 and detecting a point of failure for the equipment 104.

Every equipment 104 includes a unique identifier that identifies a test number for every test on that equipment 104, herein referred to as a tag. Data collected with respect to the equipment 104 is marked with the tag of the equipment 104. This way, the structured data is generated and stored in the database 114. In some embodiments, the data may be photographs of the equipment 104 taken from different angles. The photographs may be combined using the machine learning model 410 in order to get a more complete idea of the equipment's position in the physical world. This may be helpful in identifying the clearance between a wall near the equipment 104 and the equipment's panel.

The machine learning module 410 may be trained with the available historical data to identify defects in the equipment 104 and to predict and detect the faults in the equipment 104. In some embodiments, the machine learning model 410 may be trained to automatically to detect anomaly in the equipment 104.

In some embodiments, the machine learning model 410 identifies a cause that is attributed to an anomaly. The causes of anomaly may be attributed to a design of the equipment 104, installation of the equipment 104, maintenance of the equipment 104 and operating conditions of the equipment 104.

Figure 5:
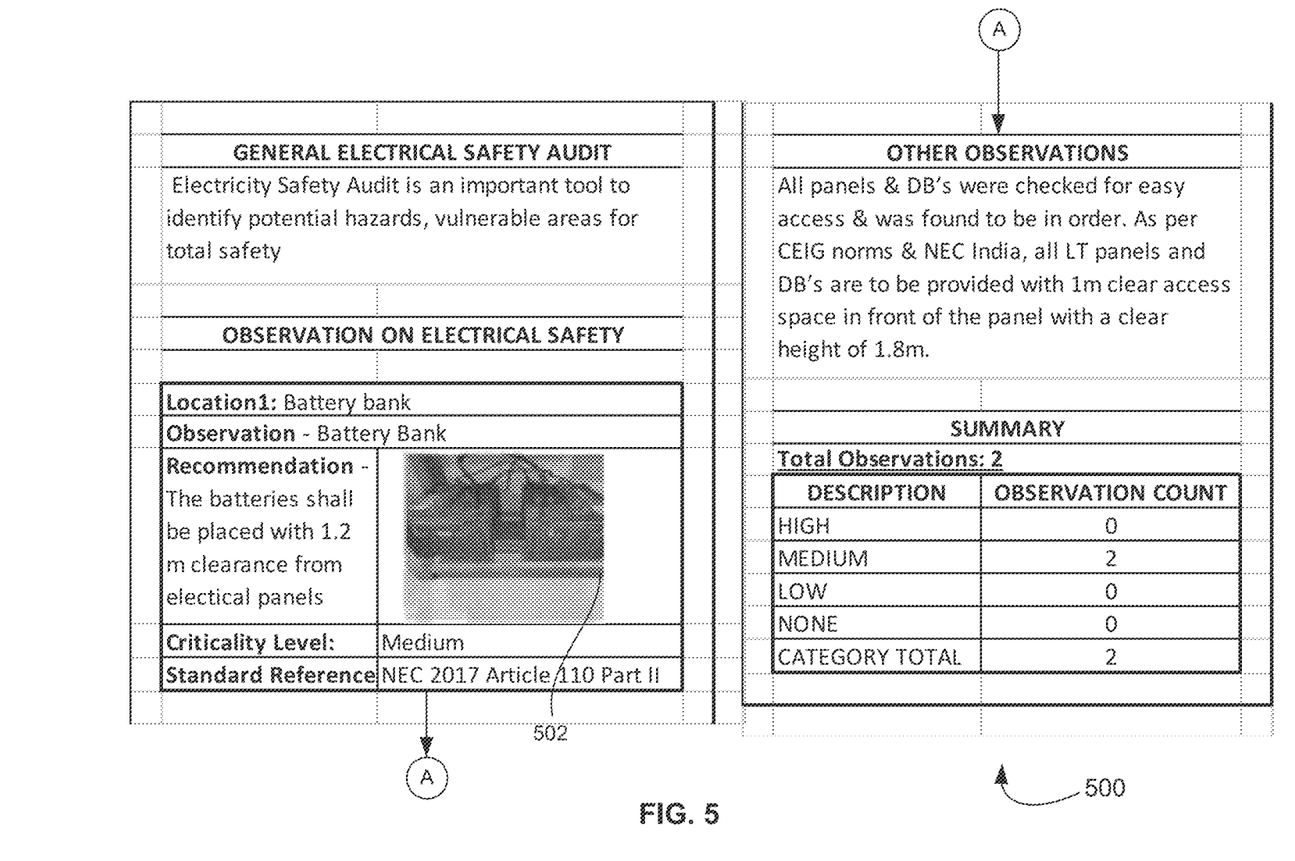
FIG. 5 illustrates a user interface view of a client device that shows a health report of the equipment according to an embodiment herein.

FIG. 5 illustrates a user interface view of a client device that shows a health report 500 of the equipment 104 according to an embodiment herein. The health report 500 may include a photograph 502 of the equipment 104. The health report 500 has various sections not limiting to basic observations, other observations, summary, etc. The health report 500 of the equipment 104 is generated based the data (e.g. the sensor data and the visual data) that is available with respect to the equipment 104 including images, site measurement readings (e.g. the sensor data), observations, recommendations, the criticality of the equipment, etc.

The health report 500 may comprise at least one of the following details (i) a equipment's location, (ii) observations on the sensor data, (iii) observations on the visual data, (iv) recommendations to rectify a fault or an anomaly in the equipment 104 or (v) a reference to industry standards. The system (as shown in FIG. 1) may automatically populate the above details in the health report 500 at relevant sections without any human intervention. The basic structure of the health report 500 is predefined and the equipment specific information is populated in the health report 500 by the system.

The system may automatically populate other information including customer details, date of field audit activity auditor's name, make and SI numbers of meter used for measurements, their calibration reports, report engineer's name and approver's name, etc. in relevant sections in the health report 500.

Figure 6A:
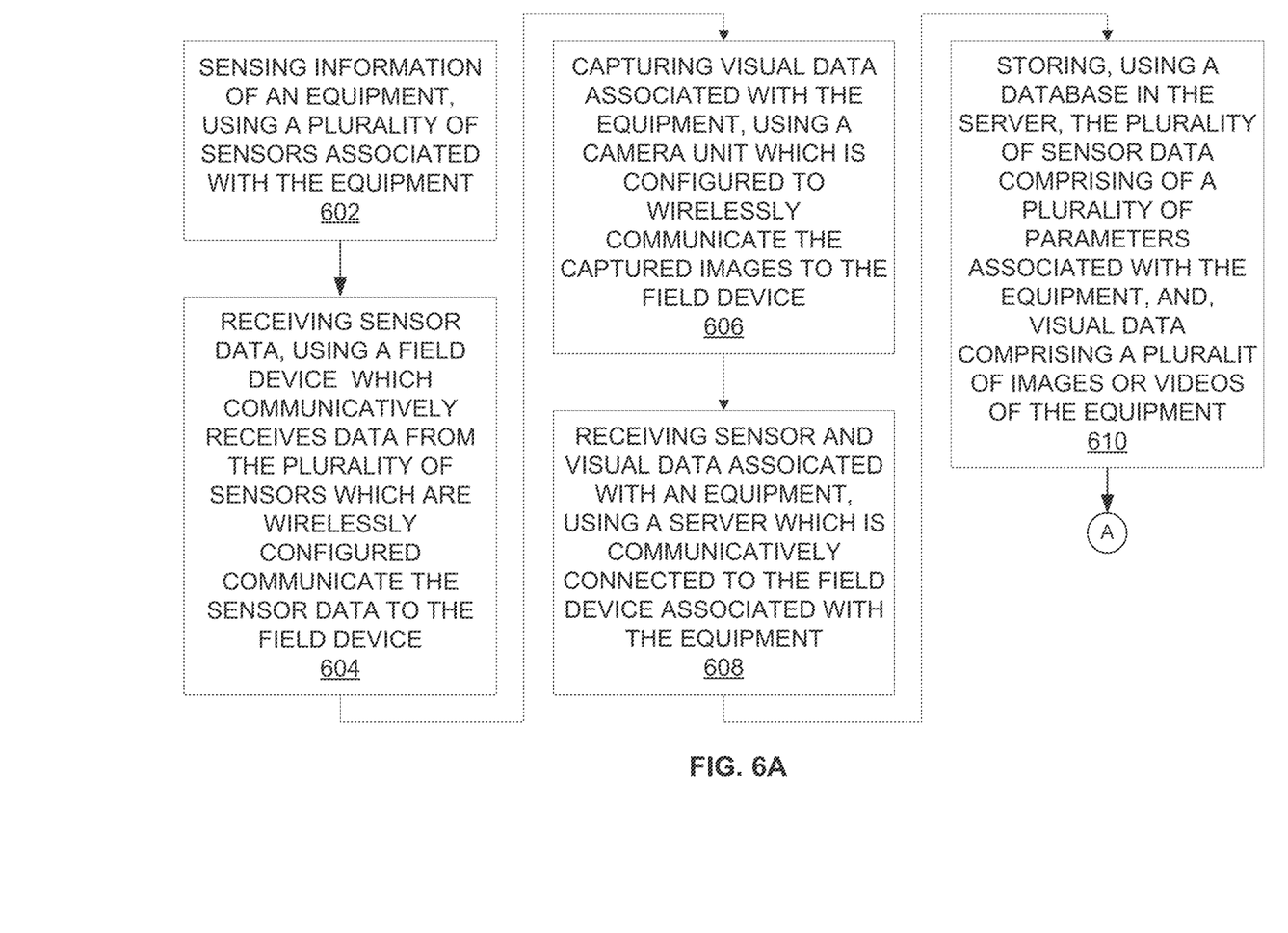
FIG. 6A and FIG. 6B are flow diagrams that illustrate a method for determining the health condition and an anomaly of the equipment using the system of FIG. 1 according to an embodiment herein.
Figure 6B:
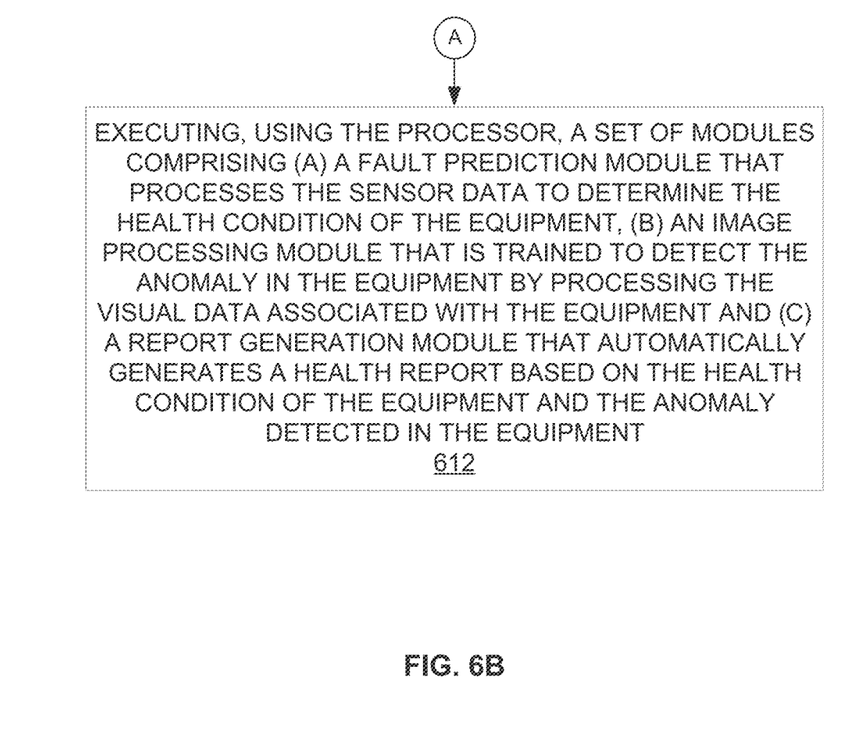

FIG. 6A and FIG. 6B are flow diagrams that illustrate a method for determining the health condition and an anomaly of the equipment 104 using the system of FIG. 1 according to an embodiment herein. In step 602, information associated with a plurality of parameters of the equipment 104 (e.g. a sensor data) is sensed using the plurality of sensors 106A-N. The plurality of sensors 106A-N are attached to the equipment 104. In step 604 the sensor data is communicated to the field device 110. The field device 110 is communicatively connected to the plurality of sensors 106A-N. In step 606, visual data associated with the equipment 104 is captured using the camera unit 108. The camera unit 108 is configured to wirelessly communicate the captured images to the field device 110. In step 608, the database 114 is generated in the server 112 with the sensor data and the visual data. In an embodiment, the sensor data comprises values of the plurality of parameters associated with the equipment 104 and the visual data comprises at least one of (i) a plurality of images of the equipment 104 or (ii) a plurality of videos of the equipment 104. In step 610, the sensor data is processed using the fault detection module 202 of the server 112 to determine a fault or the health condition of the equipment 104. In step 612, the image processing module 204 of the server 112 is trained to detect an anomaly in the equipment 104 by processing the visual data. In step 614, a report based on the health condition of the equipment and the anomaly detected in the equipment generated using the report generation module 206.

Figure 7:
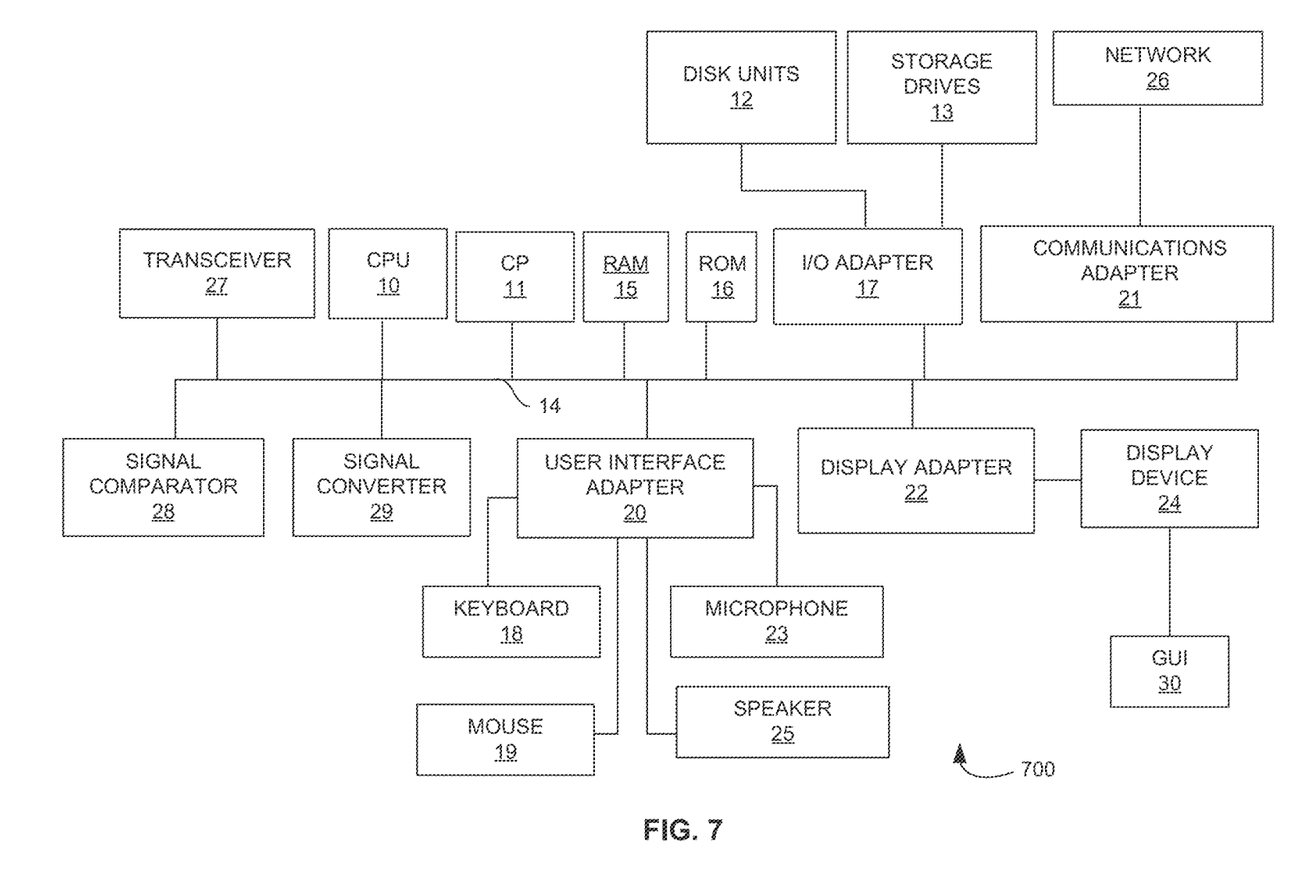
FIG. 7 is an exploded view of the Processor, according to an embodiment herein.

FIG. 7 is an exploded view of the processor according to an embodiment herein. It is a representative hardware environment for practicing the embodiments herein is depicted in FIG. 7, with reference to FIG. 1 through 6. This schematic drawing illustrates a hardware configuration of a server/computer system/user device in accordance with the embodiments herein. The processor 700 includes at least one processing device 10 and a cryptographic processor 11. The special-purpose CPU 10 and the cryptographic processor (CP) 11 may be interconnected via system bus 14 to various devices such as a random-access memory (RAM) 15, read-only memory (ROM) 16, and an input/output (I/O) adapter 17. The I/O adapter 17 can connect to peripheral devices, such as disk units 12 and tape drives 13, or other program storage devices that are readable by the system. The user device can read the inventive instructions on the program storage devices and follow these instructions to execute the methodology of the embodiments herein. The user device further includes a user interface adapter 20 that connects a keyboard 18, mouse 19, speaker 25, microphone 23, and/or other user interface devices such as a touch screen device (not shown) to the bus 14 to gather user input. Additionally, a communication adapter 21 connects the bus 14 to a data processing network 26, and a display adapter 22 connects the bus 14 to a display device 24, which provides a graphical user interface (GUI) 30 of the output data in accordance with the embodiments herein, or which may be embodied as an output device such as a monitor, printer, or transmitter, for example. Further, a transceiver 27, a signal comparator 28, and a signal converter 29 may be connected with the bus 14 for processing, transmission, receipt, comparison, and conversion of electric or electronic signals.

The present system reduces overall human intervention drastically as data collection, analysis and health report generation is automatically performed by the system. The present system increases efficiency, accuracy, consistency and unparalleled speed of execution in determining a health condition and an anomaly of the equipment 104.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

I claim:

1. A system for determining a health condition and an anomaly of an equipment (104), wherein the system comprises:
    a plurality of sensors (106A-N) that is attached to the equipment (104), wherein the plurality of sensors (106A-N) senses information associated with a plurality of parameters of the equipment (104) to provide sensor data, wherein the sensor data comprises values of the plurality of parameters associated with the equipment (104);
    a field device (110) that is communicatively connected to the plurality of sensors (106A-N), wherein the plurality of sensors (106A-N) is configured to wirelessly communicate the sensor data to the field device (110);
    a camera unit (108) that captures visual data associated with the equipment being analyzed, wherein the visual data comprises a plurality of images and videos of the equipment (104) captured at different angles, wherein the camera unit (108) is configured to wirelessly communicate the captured visual data to the field device (110); and
    a server (112) that is communicatively connected to the field device (110) for receiving the sensor data and the visual data associated with the equipment (104), wherein said server (112) comprises:
        a database (114) that stores (i) the sensor data and (ii) the visual data; and
        a processor that executes a machine learning model (410), wherein the processor performs
            (i) determining, using the machine learning model (410), a fault or the health condition of the equipment (104) when the sensor data is provided as an input to the machine learning model (410), wherein the machine learning model (410) analyzes the sensor data and determines the fault or the health condition of the equipment (104) based on the analysis;
            (ii) combining, using the machine learning model (410), the plurality of images of the equipment (104) to generate a combined photograph of the equipment (104) which provides a position of the equipment (104) in a physical world;
            (iii) detecting, using the machine learning model (410), an anomaly in the equipment (104) when the combined photograph of the equipment (104) is provided as an input to the machine learning model (410), wherein the machine learning model (410) analyzes the combined photograph of the equipment (104) and determines the anomaly in the equipment (104) based on the analysis; and (iv) automatically generating a health report (212) with the health condition of the equipment (104) and the anomaly detected in the equipment (104), wherein the health report (212) comprises (i) a location of the equipment (104), (ii) an observation based on the sensor data and the visual data, (iii) a recommendation to rectify the fault or the anomaly detected in the equipment (104), (iv) a criticality level of the fault or the anomaly detected in the equipment (104) and (v) a reference to industry standards.

2. The system as in claimed in claim 1, wherein the machine learning model (410) processes the plurality of photographs to identify the position of the equipment (104) in the physical world.

3. The system as claimed in claim 1, wherein the machine learning model (410) identifies a cause that is attributed to the anomaly, wherein the causes of the anomaly is attributed to a design of the equipment (104), installation of the equipment (104), maintenance of the equipment (104) and operating conditions of the equipment (104).

4. The system as claimed in claim 1, wherein the processor communicates with the sensor data and the visual data stored in the database (114) and employs the machine learning module (410) to determine an anomaly if there is a fault, wherein the machine learning model (410) is trained by providing historical data comprising historical sensor data and historical visual data associated with the equipment (104) as training data for detecting the fault or anomaly in the equipment (104).

5. The system as claimed in claim 1, wherein the health report (212) is communicated to the client device.

6. The system as claimed in claim 1, wherein the field device (110) communicates (i) the sensor data and (ii) the visual data to the server (112) in a plurality of stages, wherein after each of the plurality of stages, the server (112) generates an alert to the field device, wherein the alert comprises data regarding consistency and relevance of (i) the sensor data and (ii) the visual data.

7. A method for determining the health condition and an anomaly of equipment (104), wherein the method comprises the steps of sensing, using a plurality of sensors (106A-N), information associated with a plurality of parameters of the equipment (104) to provide sensor data, wherein the plurality of sensors (106A-N) is attached to the equipment (104), wherein the sensor data comprises values of the plurality of parameters associated with the equipment (104);

communicating, using the plurality of sensors (106A-N), the sensor data to a field device (110), wherein the field device (110) is communicatively connected to the plurality of sensors (106A-N);

capturing, using a camera unit (108), visual data associated with the equipment being analysed, wherein the visual data comprises a plurality of images and videos of the equipment (104) captured at different angles, wherein the camera unit (108) is configured to wirelessly communicate the captured visual data to the field device (110) or a server (112);

generating a database (114), in said server (112), with (i) the sensor data and (ii) the visual data;

determining, using a machine learning model (410), a fault or the health condition of the equipment (104) when the sensor data is provided as an input to the machine learning model (410), wherein the machine learning model (410) analyzes the sensor data and determines the fault or the health condition of the equipment (104) based on the analysis;

combining, using the machine learning model (410), the plurality of photographs of the equipment (104) to generate a combined photograph of the equipment (104) which provides a position of the equipment (104) in a physical world;

detecting, using the machine learning model (410), an anomaly in the equipment (104) when the combined photograph of the equipment (104) is provided as an input to the machine learning model (410), wherein the machine learning model (410) analyzes the combined photograph of the equipment (104) and determines the anomaly in the equipment (104) based on the analysis; and automatically generating, using the server (112), a health report (212) with the health condition of the equipment (104) and the anomaly detected in the equipment (104), wherein the health report (212) comprises (i) a location of the equipment (104), (ii) an observation based on the sensor data and the visual data, (iii) a recommendation to rectify the fault or the anomaly detected in the equipment (104), (iv) a criticality level of the fault or the anomaly detected in the equipment (104) and (v) a reference to industry standards.

8. The method as claimed in claim 7, wherein the method comprises generating, using the server (112), a work order (210) when initiated by a client device, wherein the work order (210) comprises a request to determine a health condition of the equipment (104) and an anomaly in the equipment (104).

9. The method as claimed in claim 7, wherein the method comprises tagging (i) the sensor data and (ii) the visual data with at least one of (i) a customer identifier, (ii) a work order (210) identifier, (iii) a location identifier, (iv) a facility identifier, (v) a floor identifier, (vi) an equipment (104) type, (vii) an anomaly type or (vii) an image identifier or a video identifier.

10. The method as claimed in claim 7, wherein the method comprises communicating (i) the sensor data and (ii) the visual data to the server (112) in a plurality of stages from the field device (110), wherein after each of the plurality of stages, the server (112) generates an alert to the field device (110), wherein the alert comprises data regarding consistency and relevance of (i) the sensor data and (ii) the visual data.

* * * * *